(12) United States Patent
Ono et al.

(10) Patent No.: US 8,664,825 B2
(45) Date of Patent: Mar. 4, 2014

(54) MOLDED MOTOR

(75) Inventors: Tsugiyoshi Ono, Kawasaki (JP);
Kazuyoshi Watanabe, Kawasaki (JP)

(73) Assignee: Fujitsu General Limited, Kawasaki-shi (JP)

(*) Notice: Subject to any disclaimer, the term of this patent is extended or adjusted under 35 U.S.C. 154(b) by 162 days.

(21) Appl. No.: 13/434,193

(22) Filed: Mar. 29, 2012

(65) Prior Publication Data
US 2012/0248911 A1  Oct. 4, 2012

(30) Foreign Application Priority Data

Mar. 30, 2011 (JP) .................... 2011-073773
Mar. 30, 2011 (JP) .................... 2011-073774

(51) Int. Cl.
*H02K 1/00* (2006.01)

(52) U.S. Cl.
USPC ........................................... 310/196; 310/43

(58) Field of Classification Search
USPC .................................... 310/87, 196, 43
See application file for complete search history.

(56) References Cited

U.S. PATENT DOCUMENTS

| 7,888,833 | B2 * | 2/2011 | Okada | 310/89 |
| 8,502,427 | B2 * | 8/2013 | Mizukami et al. | 310/72 |
| 8,536,756 | B2 * | 9/2013 | Watanabe et al. | 310/196 |
| 8,546,989 | B2 * | 10/2013 | Watanabe et al. | 310/156.01 |

* cited by examiner

*Primary Examiner* — Nguyen N Hanh
(74) *Attorney, Agent, or Firm* — Manabu Kanesaka

(57) ABSTRACT

Provided is a molded motor that hardly causes electric corrosion in bearings and produces less noise and vibration. Electrical continuity between a bracket 51 on an output side and a bracket 52 on a counter output side is secured by a conductive plate 60 having elasticity. Therefore, since the conductive plate 60 is unlikely to be cut off by an external force and does not change significantly with time, the electrical continuity between the bracket 51 on the output side and the bracket 52 on the counter output side is hardly interrupted. Accordingly, since a difference in potential between the bracket 51 on the output side and the bracket 52 on the counter output side hardly occurs, electric corrosion is hardly caused in a bearing 41 on the output side and a bearing 42 on the counter output side.

13 Claims, 9 Drawing Sheets

MOLDED MOTOR

CROSS-REFERENCE TO RELATED APPLICATIONS

The present application is based on, and claims priority from, Japanese Applications Serial Number JP2011-73773 and JP2011-73774, both filed Jan. 31, 2011, the disclosure of which is hereby incorporated by reference herein in its entirety.

TECHNICAL FIELD

The present invention relates to an inner-rotor type molded motor.

BACKGROUND ART

In an inner-rotor type molded motor, a rotor has its outer shell, which is made of a molded resin, arranged on the inner diameter side of a molded stator. The rotor rotates with the output side and counter output side of its output rotary shaft supported by bearings. The bearings are accommodated in bearing houses formed in brackets arranged on the output side and the counter output side of the outer shell of the stator.

Here, if there is a difference in potential between the bracket on the output side and the bracket on the counter output side, a current flows in the bearings to cause electric corrosion. The electric corrosion induces the vibration and noise of a motor. As an example of preventing electric corrosion, a molded motor has been known in which electrical continuity between a bracket on an output side and a bracket on a counter output side is established by a conductive tape attached to the side surface, i.e., the outside, of a mold (see, for example, Japanese Patent Laid-Open No. 2007-20348 (in paragraph [0019] on page 4 and FIG. 1)).

However, since the conductive tape is attached to the outside of the mold, the electrical continuity between the bracket on the output side and the bracket on the counter output side may be interrupted when the conductive tape is peeled off or cut off at assembling, integration into a product, shipment, maintenance, temporal change, or the like of the molded motor.

Accordingly, the present invention has been made in view of the above problem and is thus directed to provide a molded motor that hardly causes electric corrosion in bearings and produces less noise and vibration.

SUMMARY OF THE INVENTION

In order to solve the above problem, the present invention has some following features. More specifically, an aspect of the present invention provides a molded motor including: a stator having an outer shell molded by a molded resin; a rotor rotatably arranged on an inner diameter side of the stator; conductive bearings configured to support an output side and a counter output side of an output rotary shaft of the rotor; conductive brackets in which bearing houses configured to accommodate the bearings are arranged on an output side and a counter output side of the outer shell; and a conductive plate having a ring-shaped end with convex portions formed at an inner peripheral face thereof and configured to be press-fitted in an outer periphery of at least one of the bearing house on the output side and the bearing house on the counter output side, the conductive plate being configured to establish electrical continuity between the bracket on the output side and the bracket on the counter output side.

According to this configuration, the electrical continuity between the bracket on the output side and the bracket on the counter output side is secured by the conductive plate having elasticity. Therefore, since the conductive plate is unlikely to be cut off by an external force and does not change significantly with time, the electrical continuity between the bracket on the output side and the bracket on the counter output side is hardly interrupted. Accordingly, since a difference in potential between the bracket on the output side and the bracket on the counter output side hardly occurs, electric corrosion is hardly caused in the bearings. As a result, the molded motor that produces less noise and vibration is obtained.

In addition, when the ring-shaped end is press-fitted in one of the bearing houses, convex portions formed at the ring inner periphery of the ring-shaped end to be press-fitted are deformed in the press-fitting direction of the bearing house. Then, a restoring force, which makes the convex portions return in a direction opposite to the press-fitting direction after the press-fitting, causes a force to be applied in the direction in which the convex portions at the ring inner periphery come in contact with the side face of the bearing house. As a result, the electrical continuity between the bearing house and the conductive plate is reliably established.

Moreover, since the convex portions are bended, stress applied from the ring inner periphery to the side face of the bearing house is reduced and the deformation of the bearing house is prevented. Accordingly, the deformation of the bearing inside the bearing house is also prevented, and an interval between the rolling elements and the inner and outer rings of the bearing is appropriately secured. As a result, the molded motor that produces less noise and vibration is obtained.

Preferably, a groove part configured to accommodate the conductive plate may be provided in an end face of the outer shell on the counter output side and in a side face of the outer shell.

According to this configuration, since the conductive plate is accommodated in the groove part, the conductive plate does not protrude from the end face and the side face of the outer shell. Accordingly, the conductive plate does not interfere with the handling of the molded motor.

Preferably, the convex portions may be bended in a direction opposite to a direction in which the ring-shaped end is inserted into one of the bearing houses.

According to this configuration, since the convex portions formed at the ring inner periphery of the ring-shaped end warp toward the inserting direction of the bearing house, the convex portions are further likely to be bended at the press-fitting and stress applied to the bearing house is further reduced. As a result, the deformation of the bearing house is further prevented. Accordingly, the deformation of the bearing inside the bearing house is also further prevented, and the interval between the rolling elements and the inner and outer rings of the bearing is further appropriately secured. As a result, the molded motor that produces further less noise and vibration is obtained.

Preferably, the convex portions may be formed at three or more places along the inner peripheral face of the ring-shaped end.

According to this configuration, since the ring-shaped end is press-fitted in the bearing house on the counter output side in a state in which the convex portions formed at the three or more places of the ring inner periphery come in contact with the bearing house, the ring-shaped end is press-fitted to align its center with the center of the bearing house. As a result, the ring inner periphery reliably comes in contact with the bearing house. In addition, since a force is less intensively applied to only one place and stress applied to the bearing house on the counter output side is evenly dispersed, the deformation of the bearing house on the counter output side is further reliably prevented.

Preferably, the conductive plate may have a plate-shaped conductive strip extending from part of a ring outer periphery of the ring-shaped end, and at least one of the convex portions may be arranged in a direction opposite to a direction in which the conductive strip is drawn.

According to this configuration, when the ring-shaped end is press-fitted in the bearing house on the counter output side, the joint end of the conductive strip comes in contact with the side face of the outer shell and the conductive strip is deformed in the direction in which a bending angle θ of a bending part increases. At this tune, the conductive strip is acted upon by a restoring force that restores the conductive strip to its initial position, and the ring-shaped end is thus pulled by the restoring force in the direction in which the conductive strip is drawn. Accordingly, stress is applied between the side face of the bearing house and the inner peripheral face of the ring-shaped end in the direction opposite to the direction in which the conductive strip is drawn. Here, since at least one of the convex portions is arranged in the direction opposite to the direction in which the conductive strip is drawn, the stress applied to the ring-shaped end in the direction opposite to the direction in which the conductive strip is drawn is received by the corresponding one of the convex portions. As a result, the deformation of the bearing house on the counter output side is prevented.

Preferably, a tip end face of each of the convex portions may be processed into a shape matching a side face of each of the bearing houses and may be chamfered at a corner thereof.

According to this configuration, since the tip end face of each of the convex portions is processed into the shape matching the side face of the bearing house, the bearing house is hardly scratched by an acute edge when the ring-shaped end is press-fitted in the bearing house. Accordingly, a crack resulting from a scratch is hardly caused in the bearing house due to vibration or the like, and the position of the bearing is less deviated. As a result, the molded motor that produces less noise and vibration resulting from the deviation of the output rotary shaft is obtained.

Preferably, the convex portions have dimensions such that a length L1 of a base of each of the convex portions in a ring peripheral direction may be larger than a length L2 of each of the convex portions in a diameter direction.

According to this configuration, since the length L1 of the base of each of the convex portions in the ring peripheral direction is larger than the length L2 of each of the convex portions in the diameter direction, each of the convex portions is hardly deformed to a certain degree, i.e., it has certain strength. Accordingly, the conductive plate is firmly joined to the bearing house on the counter output side. As a result, the electrical continuity between the bearing house and the conductive plate is reliably established. In addition, the position of the center of the bearing house on the counter output side is hardly deviated from that of the center of the ring-shaped end.

Preferably, the bearing houses may be formed into bottomed cylindrical shapes each having a bottom face and a side face, and a corner part connecting the bottom face to the side face may be formed into an R-shape having a predetermined curvature.

According to this configuration, since the convex portions are gradually deformed along the corner part formed into the R-shape having a predetermined curvature that connects the bottom face to the side face of the bearing house when the ring-shaped end is press-fitted in the bearing house, it is possible to perform the press-fitting without sharply applying a large force. As a result, the deformation of the bearing house is further prevented. Accordingly, the press-fitting is facilitated, the deformation of the bearing inside the bearing house is further prevented, and an interval between the rolling elements and the inner and outer rings of the bearing is further appropriately secured. As a result, the molded motor that produces further less noise and vibration is obtained.

Also, the present invention has the following aspect. More specifically, another aspect of the present invention provides a molded motor including: a stator having an outer shell molded by a molded resin; a rotor rotatably arranged on an inner diameter side of the stator; conductive bearings configured to support an output side and a counter output side of an output rotary shaft of the rotor; conductive brackets in which bearing houses configured to accommodate the bearings are arranged on an output side and a counter output side of the outer shell; and a conductive plate having conductivity configured to establish electrical continuity between the brackets, wherein the conductive plate has a plate-shaped conductive strip and joint ends provided at both ends of the conductive strip, the conductive strip is arranged along the outer shell, and at least one of the joint ends has a joint part configured to be joined to one of the brackets in a state of being held between the corresponding bracket and a side face of the outer shell, an engagement part positioned ahead of the joint part and configured to engage an end face of the outer shell, and a tip end part positioned ahead of the engagement part and provided to raise from the end face of the outer shell.

According to this configuration, the electrical continuity between the bracket on the output side and the bracket on the counter output side is secured by the conductive plate. Therefore, since the conductive plate is unlikely to be cut off by an external force and does not change significantly with time, the electrical continuity between the bracket on the output side and the bracket on the counter output side is hardly interrupted. Accordingly, since a difference in potential between the bracket on the output side and the bracket on the counter output side hardly occurs, electric corrosion is hardly caused in the bearings. As a result, the molded motor that produces less noise and vibration is obtained. In addition, when moving from the side face to the end face of the outer shell, the joint end reaches a boundary between the side face and the end face of the outer shell more quickly and thus passes through the boundary more quickly. As a result, the molded motor that is easily assembled is obtained. Moreover, since the side face of the outer shell is hardly damaged, the molded motor that does not induce an insulation failure is obtained.

Preferably, a groove part configured to accommodate the conductive plate may be provided in the outer shell.

According to this configuration, since the conductive plate is accommodated in the groove part, the conductive plate does not protrude from the side face of the outer shell. Accordingly, the conductive plate does not interfere with the handling of the molded motor.

Preferably, the brackets may have the bearing houses configured to accommodate the bearings, and the other of the joint ends may have a ring-shaped end configured to be press-fitted in one of the bearing house on the output side and the bearing house on the counter output side.

According to this configuration, since the ring-shaped end is press-fitted in one of the bearing houses, the position of the conductive plate is secured and hardly deviated. Therefore, the electrical continuity between the bracket on the output side and the bracket on the counter output side is further hardly interrupted. Accordingly, since a difference in potential between the bracket on the output side and the bracket on the counter output side further hardly occurs, electric corrosion further hardly occurs in the bearings. As a result, the molded motor that produces further less noise and vibration is obtained. In addition, the joint end is held between the bracket and the side face of the outer shell in a state in which the ring-shaped end as the other end is press-fitted in the bearing house and positioned. As a result, the molded motor that is easily assembled is obtained.

Preferably, a length of the conductive strip from the ring-shaped end to the side face of the outer shell may be larger than a length from the joint part to the tip end part.

According to this configuration, when the ring-shaped end is being press-fitted, an angle between a part from the ring-shaped end to the side face of the outer shell and a part arranged along the side face of the outer shell is required to be greater than or equal to 90°. At this time, the ring-shaped end is acted upon by a tensile force toward the side face of the outer shell. If the length of the conductive strip from the ring-shaped end to the side face of the outer shell is large, the tensile force becomes small. As a result, plastic deformation is prevented from occurring in the conductive plate.

Preferably, a protrusion configured to protect the tip end part of the conductive plate may be formed on the end face of the outer shell.

According to this configuration, since the protrusion configured to protect the tip end part of the conductive plate is formed, part of the tip end part accommodated in a groove is protected by the protrusion and thus hardly disengaged.

DETAILED DESCRIPTION

A preferred embodiment of the present invention will be described in detail below with reference to the drawings. Note that the same elements will be denoted by the same reference symbols in the entire description of the embodiment.

Figure 1A:
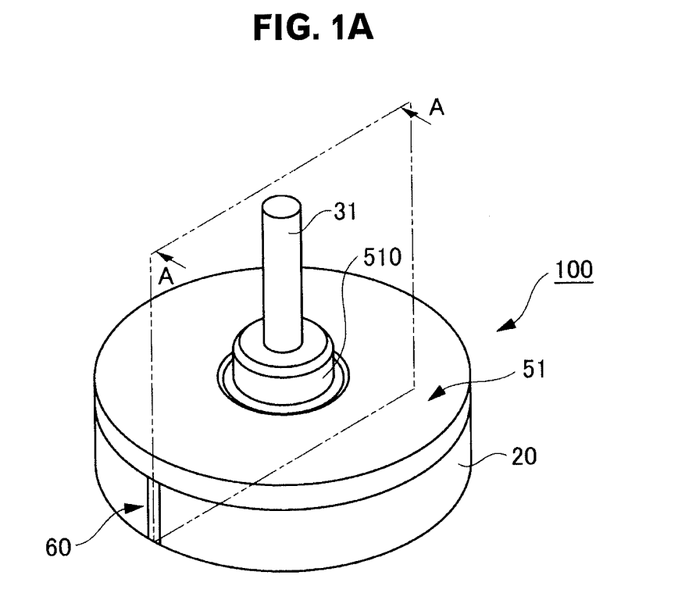
FIG. 1A is a schematic perspective view of a molded motor according to an embodiment as seen from its output side.
Figure 1B:
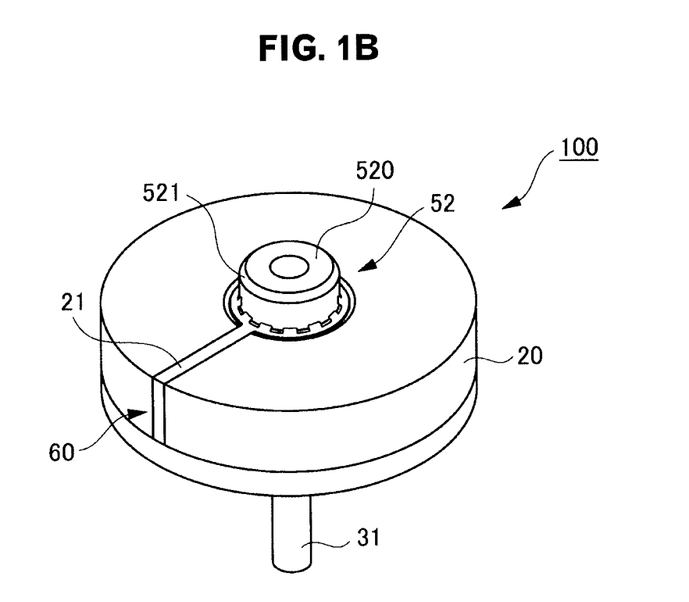
FIG. 1B is a schematic perspective view of the molded motor according to the embodiment as seen from its counter output side.
Figure 2:
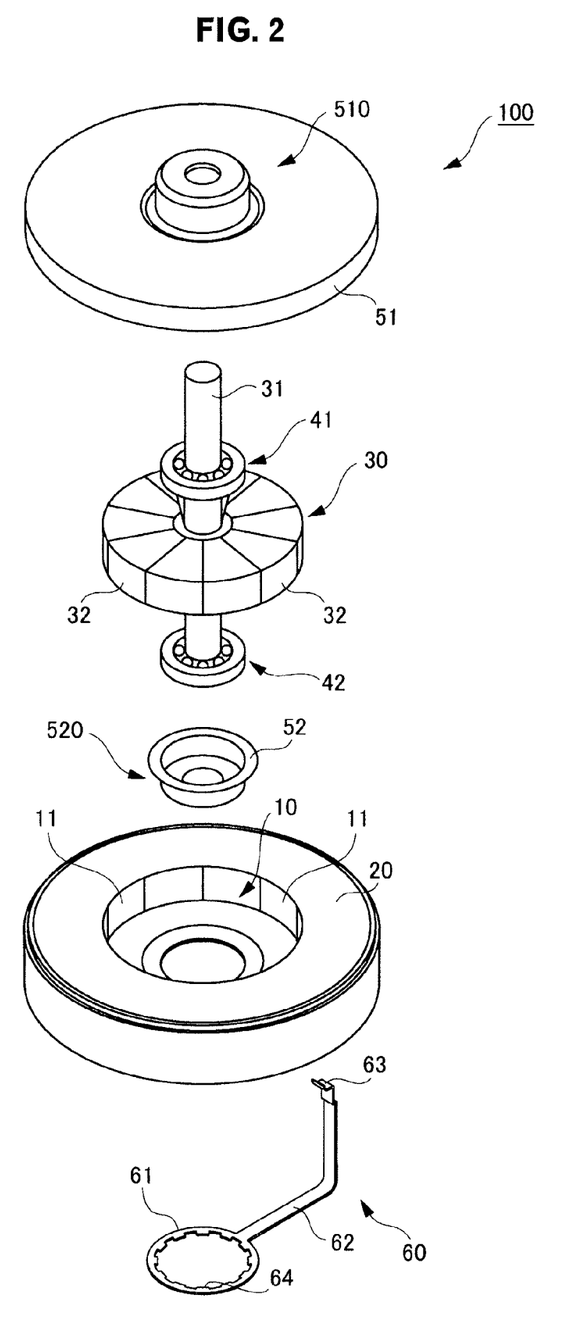
FIG. 2 is a schematic exploded perspective view of the molded motor.
Figure 3:
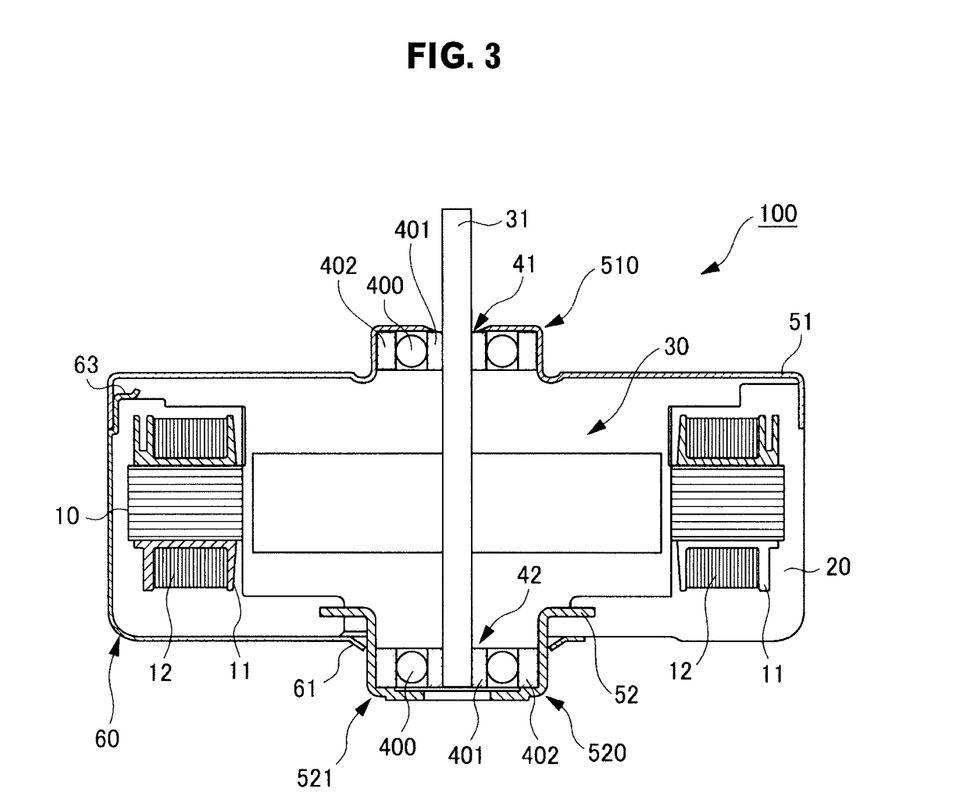
FIG. 3 is a schematic cross-sectional view of the molded motor taken along the line A-A in FIG. 1A.

FIGS. 1A and 1B are schematic perspective views of a molded motor 100 according to the embodiment. More specifically, FIG. 1A is the schematic perspective view of the molded motor 100 as seen from its output side, and FIG. 1B is the schematic perspective view of the molded motor 100 as seen from its counter output side. FIG. 2 is a schematic exploded perspective view of the molded motor 100. FIG. 3 is a schematic cross-sectional view of the molded motor 100 taken along the line A-A in FIG. 1A.

In FIGS. 1A and 1B, FIG. 2, and FIG. 3, the molded motor 100 has a stator core 10, a molded resin 20, a rotor 30, a bearing 41 on the output side, a bearing 42 on the counter output side, a bracket 51 on the output side, a bracket 52 on the counter output side, and a conductive plate 60.

The stator core 10 is composed of laminated steel plates and has an annular yoke part and plural teeth parts 11 extending from the yoke part to the inner diameter side of the stator core 10. The stator core 10 is subjected to pre-molding to form an insulator, and winding 12 is wound on the teeth parts 11 through the insulator. Except for its inner peripheral face, the stator core 10 having the winding 12 wound thereon is molded by the molded resin 20 to form its outer shell. The outer shell is formed into a cylindrical shape and has the metal bracket 52 integrally embedded at its face on the counter output side. In the bracket 52 on the counter output side, a bearing house 520 for accommodating the bearing 42 exposes from the outer shell.

The rotor 30 has an output rotary shaft 31 and plural permanent magnets 32. The permanent magnets 32 are arranged about the output rotary shaft 31 at even intervals and in their positions such that the neighboring permanent magnets 32 alternately have opposite N and S magnetic poles, and are integrated with the output rotary shaft 31. The permanent magnets 32 may be formed as ferrite bond magnets in such a manner that a resin material is mixed with a ferrite magnetic substance, molded, and then magnetized. The rotor 30 is oppositely accommodated inside the inner periphery of the stator core 10 at a predetermined gap.

Note that the rotor according to the embodiment of the present invention is not limited to this but may be changed if necessary. For example, rare-earth magnets may be used instead of ferrite magnets. In addition, sintered magnets may be used instead of bond magnets.

The output rotary shaft 31 passes through the bearing 41 on the output side and the bearing 42 on the counter output side and is rotatably supported by the bearings 41 and 42. As the bearing 41 on the output side and the bearing 42 on the counter output side, ball bearings may be, for example, used. According to the embodiment, the bearings 41 and 42 have balls 400 serving as rolling elements, an inner ring 401, and an outer ring 402.

In FIGS. 1A and 1B, FIG. 2, and FIG. 3, the bearing 41 on the output side is accommodated in a bearing house 510 on the output side formed in the metal bracket 51 on the output side. The bracket 51 on the output side is fitted in the end face of the outer shell on the output side.

In FIGS. 1A and 1B, one end of the conductive plate 60 is press-fitted in the bearing house 520 on the counter output side, while the other end of the conductive plate 60 is joined to the bracket 51 on the output side. The conductive plate 60 will be described in detail below.

Figure 4A:
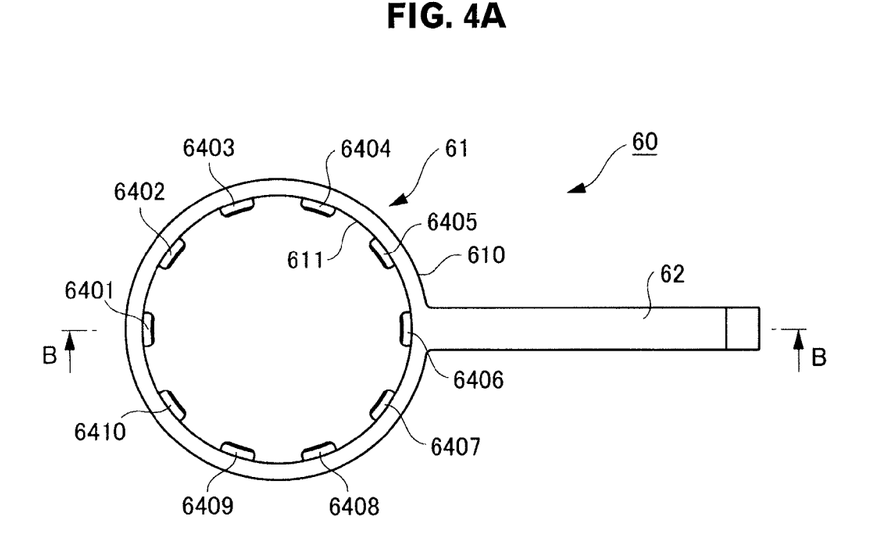
FIG. 4A is a plan view of a conductive plate.
Figure 4B:
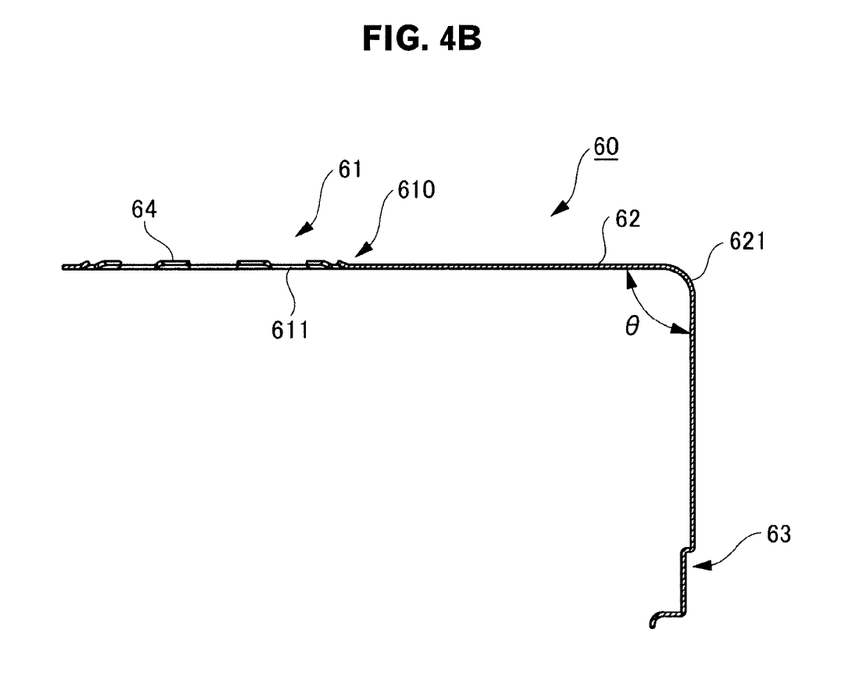
FIG. 4B is a cross-sectional view taken along the line B-B in FIG. 4A.
Figure 5:
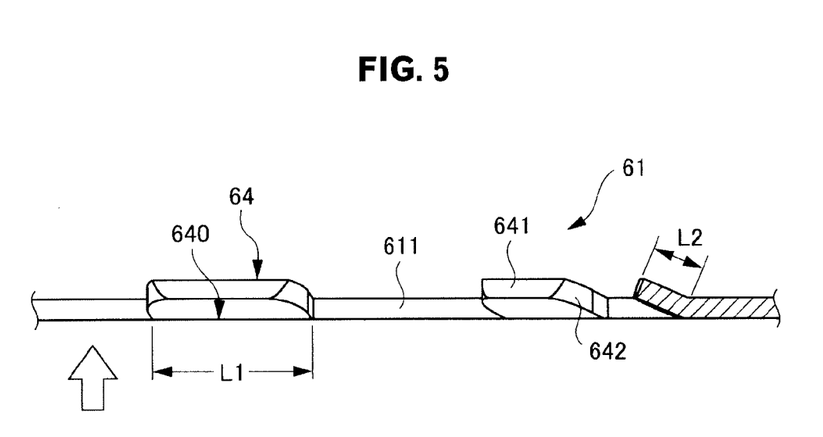
FIG. 5 is an enlarged view of the convex portions of the conductive plate.

FIG. 2 and FIG. 4A are plan views of the conductive plate 60, and FIG. 4B is a cross-sectional view of the conductive plate 60 taken along the line B-B in FIG. 4A. FIG. 5 is an enlarged view of convex portions 64 of the conductive plate 60.

As illustrated in FIG. 4A, the conductive plate 60 is a metal plate having conductivity and has a ring-shaped end 61 and a plate-shaped conductive strip 62 extending from part of a ring outer periphery 610 of the ring-shaped end 61. As illustrated in FIGS. 1A and 1B, FIG. 3, and FIG. 4B, the conductive strip 62 is bended in its mid course and has a substantially L-shape in the cross-sectional view. More specifically, the conductive strip 62 is bended to be along the end face of the outer shell on the counter output side and along the side face of the outer shell. A groove part 21 for accommodating the conductive plate 60 is provided at the end face of the outer shell on the counter output side and at the side face of the outer shell. In addition, the conductive plate 60 has a joint end 63 at its end on the side opposite to the ring-shaped end 61 of the conductive strip 62. The conductive plate 60 may have a thickness of, for example, about 0.4 mm. Note that the conductive plate 60 is not limited to a metal plate but may be a plate-shaped member having conductivity. Here, a length L1 of the conductive strip 62 from the ring-shaped end 61 to the side face of the outer shell is preferably larger than a length L2 of the joint end 63 from a joint part 630 to a tip end part 631 of the joint end 63 as will be described later.

In FIG. 1B and FIG. 3, the ring-shaped end 61 is press-fitted in the bearing house 520 on the counter output side. The bearing house 520 is formed into a bottomed cylindrical shape by, for example, pressing. The bearing 42 is accommodated inside the bearing house 520, while the ring-shaped end 61 is press-fitted outside the bearing house 520. A corner part 521 connecting the bottom face to side face of the bearing house 520 is formed into an R-shape having a predetermined curvature.

On the other hand, the joint end 63 is joined to the bracket 51 on the output side in a state of being held between the side face of the outer shell and the bracket 51 on the output side.

In FIG. 1B, FIG. 2, FIG. 3, and FIGS. 4A and 4B, the convex portions 64 are formed at even intervals at ten places of the ring inner periphery 611 of the ring-shaped end 61. Among them, one convex portion 6401 is arranged in a direction opposite to the direction in which the conductive strip 62 is drawn.

FIG. 5 is the enlarged view of the convex portions 64 of the conductive plate 60. In FIG. 5, the inserting direction of the bearing house 520 on the counter output side into the ring-shaped end 61 is denoted by a solid-white arrow. In FIG. 5, the convex portions 64 are formed into substantially rectangular shapes and formed to warp toward the inserting direction of the bearing house 520 on the counter output side.

Figure 6:
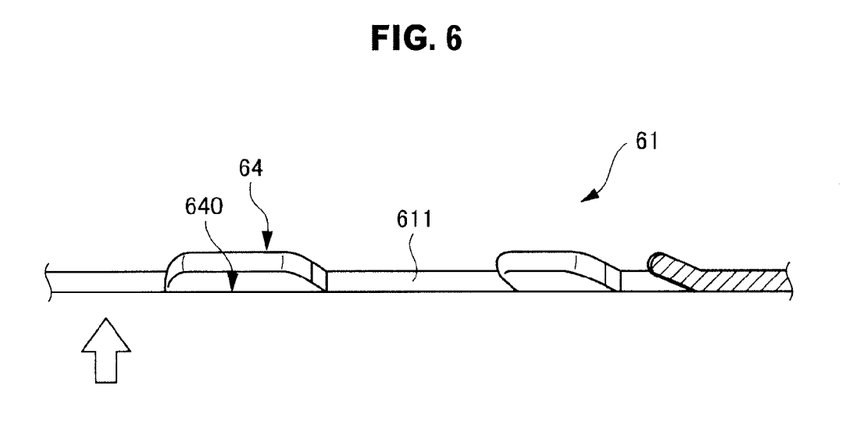
FIG. 6 is an enlarged view of the convex portions of the conductive plate according to a modification.

Tip end faces 641 of the convex portions 64 are chamfered at their corner parts 642. In addition, the tip end faces 641 of the convex portions 64 are formed into arc-shapes to be along the side face of the bearing house 520 on the counter output side. Moreover, edges at the tip end parts of the convex portions 64 may be processed into curved shapes as illustrated in FIG. 6 as a modification. Furthermore, the convex portions 64 preferably have dimensions such that the lengths L1 of bases 640 of the convex portions 64 in the peripheral direction of the ring-shaped end 61 are larger than the lengths L2 of the convex portions 64 in the diameter direction of the ring-shaped end 61. The molded motor 100 thus configured supplies a current to the winding 12 in accordance with the rotational position of the rotor 30 detected by a position detection sensor (not illustrated) to generate a rotating magnetic field in the stator core 10, whereby the rotor 30 is allowed to rotate with the output rotary shaft 31.

Figure 7A:
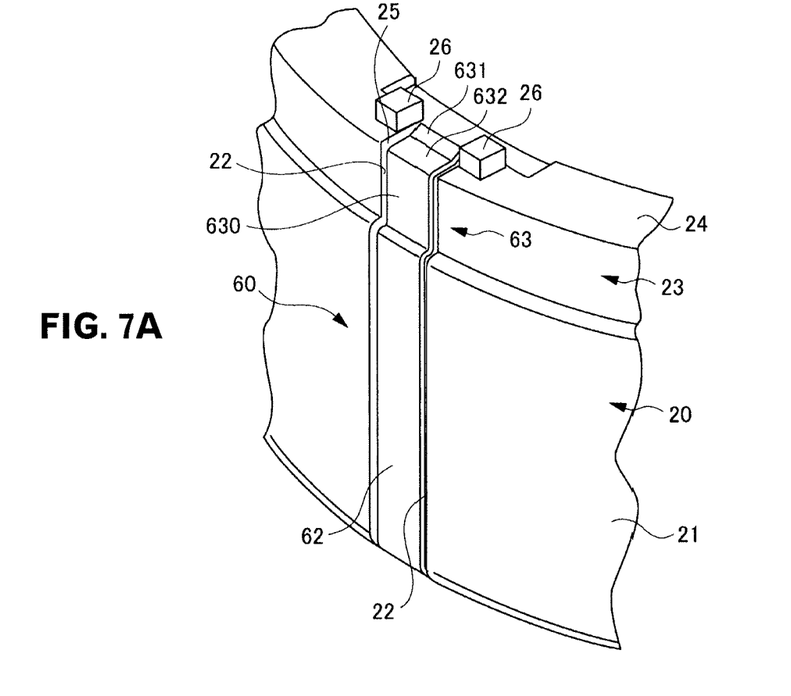
FIG. 7A is a view illustrating the vicinity of a joint end joined to a bracket on the output side.
Figure 7B:
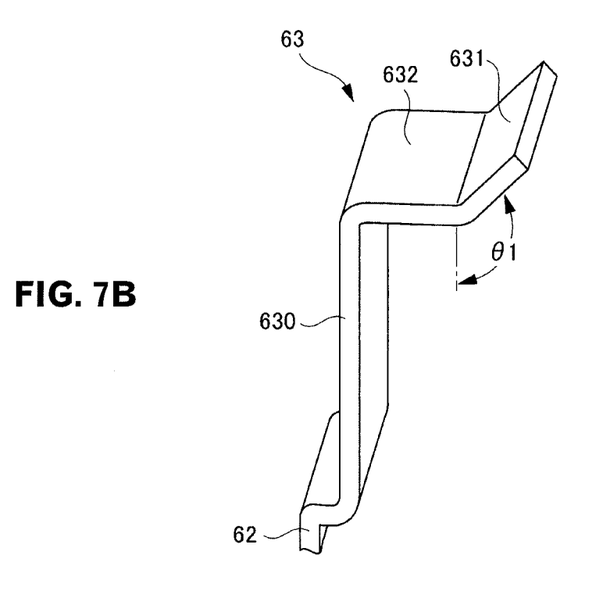
FIG. 7B is an enlarged perspective view of the joint end.

FIG. 7A is a view illustrating the vicinity of the joint end 63 joined to the bracket 51 on the output side. FIG. 7B is an enlarged perspective view of the joint end 63. Note that the bracket 51 on the output side is removed in FIG. 7A.

In FIG. 7A, a step 23 is provided in the molded resin 20 on the side to which the bracket 51 on the output side (not illustrated in FIG. 7A) is attached. The bracket 51 on the output side is fitted in the step 23.

The conductive strip 62 of the conductive plate 60 is accommodated and arranged in the groove part 22 formed in a side face 21 of the outer shell of the molded resin 20. The groove part 22 is formed ranging from the step 23 to an end face 24 of the outer shell of the molded resin 20, and a groove 25 is formed in the end face 24 of the outer shell in a direction orthogonal to the side face 21. Here, among the bottom faces of the groove part 22 formed in the step 23, a face parallel to the side face 21 of the molded resin 20 is also referred to as the side face 21.

In FIG. 7B, the joint end 63 has the joint part 630 joined to the bracket 51 on the output side at its joint face and has the tip end part 631 bended to be along the end face 24 of the outer shell at a position ahead of the joint part 630. The tip end part 631 is formed to raise from the end face 24 of the outer shell at a tip end angle θ1 of greater than 90° and less than or equal to 180° relative to the conductive strip 62. Also, the joint end 63 has an engagement part 632 for engaging the end face 24 of the outer shell between the joint part 630 and the tip end part 631.

In FIG. 7A, the joint end 63 is accommodated in the groove part 22 ranging from the step 23 to the end face 24 of the outer shell of the molded resin 20. On the other hand, the engagement part 632 and the tip end part 631 serving as parts of the joint part 630 of the joint end 63 are accommodated in the groove 25 formed in the end face 24 of the outer shell in the direction orthogonal to the side face 21.

On the end face 24 of the outer shell of the molded resin 20, protrusions 26 for protecting the tip end part 631 are formed on both sides of the groove 25 distant from the side face 21. One of the protrusions 26 may be formed on one side of the groove 25, or the protrusions 26 may be formed on a side near the side face 21. The protrusions 26 formed near the groove 25 protect the tip end part 631 even if the tip end part 631 of the joint end 63 accommodated in the groove 25 is formed to raise from the end face of the outer shell. In other words, the tip end part 631 is protected by the protrusions 26 even if, for example, the finger or the like of an operator comes close to the tip end part 631. Therefore, the finger does not touch the tip end part 631, which makes the tip end part 631 be hardly disengaged from the groove 25. Here, one of the side faces of each protrusion 26 is preferably formed to be continuous with the side face of the groove 25.

Figure 8A:
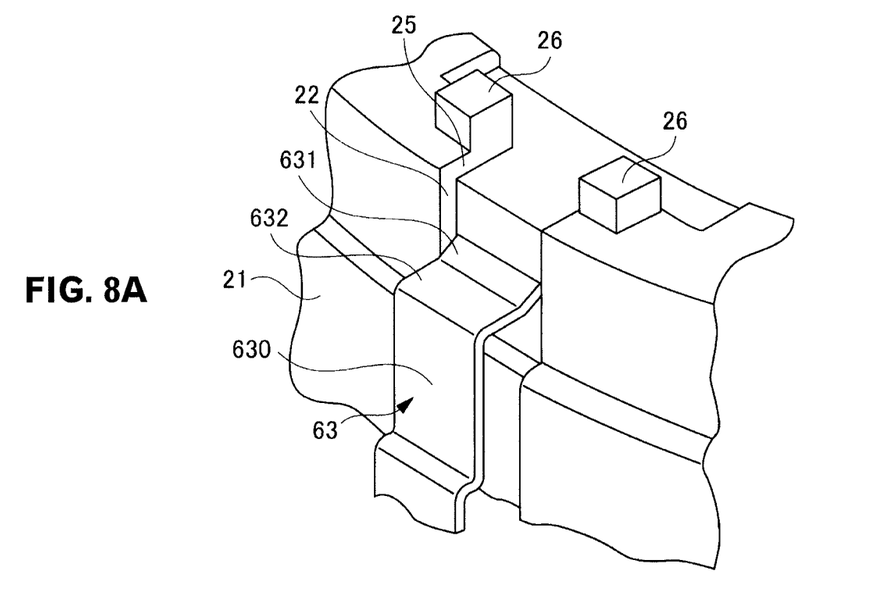
FIG. 8A is a view illustrating a state before the joint end is accommodated in a groove.
Figure 8B:
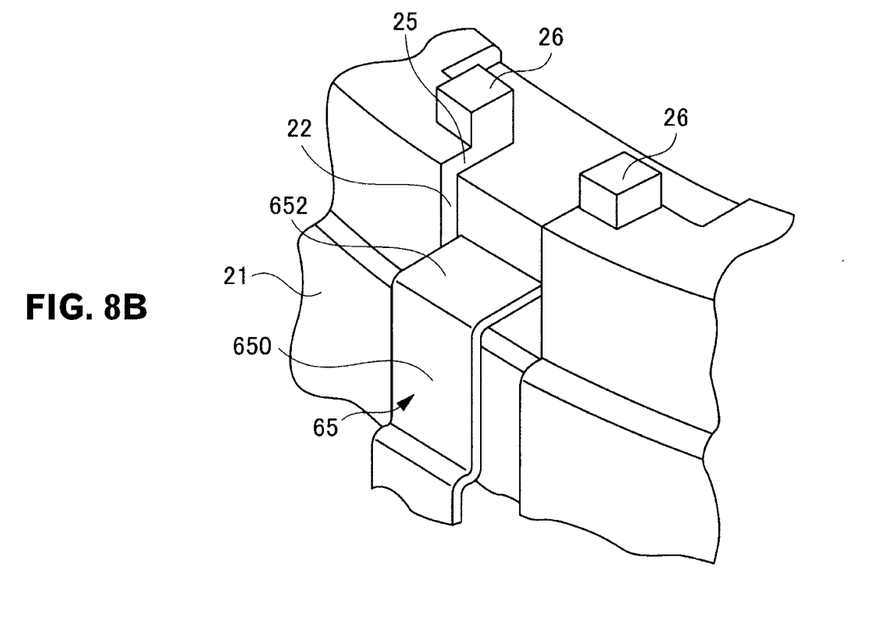
FIG. 8B is a view illustrating a state before a joint end according to a comparative example is accommodated in the groove.

FIG. 8A is a view illustrating a state before part of the joint end 63 is accommodated in the groove 25, and FIG. 8B is a view illustrating a state before part of a joint end 65 according to a comparative example is accommodated in the groove 25.

The comparative example will be described below.

Comparative Example

Except that the shape of the joint end 65 is different from that of the embodiment, the comparative example is the same as the embodiment in other constituents or the like.

In FIG. 8B, the joint end 65 according to the comparative example has only a joint part 650 and an engagement part 652 and does not have the tip end part 631 according to the embodiment.

According to the embodiment, the tip end part 631 is inclined toward a direction along the side face 21 of the groove part 22 as illustrated in FIG. 8A. On the other hand, according to the comparative example, the joint end 65 comes in contact with the side face 21 of the groove part 22 at an almost right angle as illustrated in FIG. 8B.

First Modification

Figure 9:
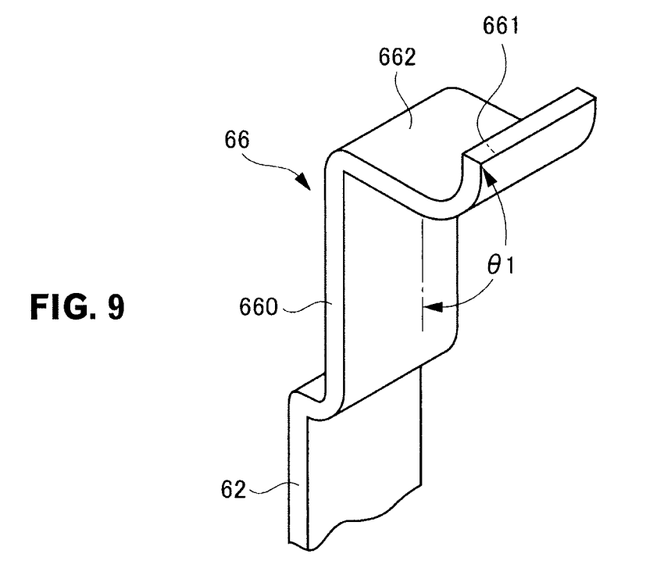
FIG. 9 is an enlarged perspective view of a joint end according to a first modification.

FIG. 9 is an enlarged perspective view of a joint end 66 according to a first modification. Except that the shape of the tip end part of the joint end 66 is different from that of the embodiment, the first modification is the same as the embodiment in other constituents or the like.

In FIG. 9, the joint end 66 has a joint part 660 joined to the bracket 51 on the output side at its joint face and has a tip end part 661. The tip end part 661 is positioned ahead of the joint part 660, bended to be formed into an R-shape, and provided to raise from the end face 24 of the outer shell at a tip end angle θ1 of nearly 180° relative to the conductive strip 62. Also, the joint end 66 has an engagement part 662 for engaging the end face 24 of the outer shell between the joint part 660 and the tip end part 661.

According to the first modification, since the tip end part 661 comes in surface-contact with the side face 21 of the groove part 22 unlike the tip end 65 according to the comparative example illustrated in FIG. 8B, the outer shell is hardly damaged by the tip end of the conductive plate 60.

The molded motor 100 thus configured supplies a current to the winding 12 in accordance with the rotational position of the rotor 30 detected by a position detection sensor (not illustrated) to generate a rotating magnetic field in the stator core 10, whereby the rotor 30 is allowed to rotate with the output rotary shaft 31.

According to the embodiment described above, the following advantages are obtained.

(1) Electrical continuity between the bracket 51 on the output side and the bracket 52 on the counter output side is established by the conductive plate 60 having elasticity. Therefore, since the conductive plate 60 is unlikely to be cut off by an external force and does not change significantly with time, the electrical continuity between the bracket 51 on the output side and the bracket 52 on the counter output side is hardly interrupted. Accordingly, since a difference in potential between the bracket 51 on the output side and the bracket 52 on the counter output side hardly occurs, electric corrosion is hardly caused in the bearing 41 on the output side and the bearing 42 on the counter output side. As a result, the molded motor 100 that produces less noise and vibration is obtained. In addition, when moving from the side face 21 to the end face 24 of the outer shell, the joint end 63 reaches a boundary between the side face 21 and the end face 24 more quickly and thus passes through the boundary more quickly. As a result, the molded motor 100 that is easily assembled is obtained. Moreover, since the side face 21 of the outer shell is hardly damaged, the molded motor 100 that does not induce an insulation failure is obtained.

(2) Since the conductive plate 60 is accommodated in the groove part 22, the conductive plate 60 does not protrude from the end face 24 and the side face 21 of the outer shell. Accordingly, the conductive plate 60 does not interfere with the handling of the motor.

(3) Since the ring-shaped end 61 is press-fitted in the bearing house 520 on the counter output side, the position of the conductive plate 60 is secured and hardly deviated. Therefore, the electrical continuity between the bracket 51 on the output side and the bracket 52 on the counter output side is further hardly interrupted. Accordingly, since a difference in potential between the bracket 51 on the output side and the bracket 52 on the counter output side further hardly occurs, electric corrosion hardly occurs in the bearing 41 on the output side and the bearing 42 on the counter output side. As a result, the molded motor 100 that produces less noise and vibration is obtained.

In addition, the joint end 63 is held between the bracket 51 on the output side and the side face 21 of the outer shell of the molded resin 20 in a state in which the ring-shaped end 61 as the other end is press-fitted in the bearing house 520 on the counter output side and positioned. As a result, the molded motor 100 that is easily assembled is obtained.

(4) When the ring-shaped end 61 is being press-fitted, the angle θ (see FIG. 4B) between a part from the ring-shaped end 61 to the side face 21 of the outer shell and a part arranged along the side face 21 of the outer shell is required to be greater than or equal to 90°. At this time, the ring-shaped end 61 is acted upon by a tensile force toward the side face 21 of the outer shell. If the length L1 of the conductive strip 60 from the ring-shaped end 61 to the side face 21 of the outer shell is large, the tensile force acted upon the ring-shaped end 61 becomes small. In addition, the smaller the length L2 from the joint part 630 to the tip end part 631, the smaller the angle θ at the press-fitting is required. As a result, plastic deformation is prevented from occurring.

(5) When the joint end 63 is slid along the side face 21 of the outer shell of the molded resin 20 and accommodated in the groove 25, the tip end angle of the tip end part 631 relative to the conductive strip 62 is greater than 90° and less than or equal to 180°. Therefore, since a force applied to the tip end part 631 is released in a direction along the side face 21 of the outer shell, the joint end 63 is easily moved along the side face 21 of the outer shell. Accordingly, the molded resin 20 is hardly damaged by the tip end part 631, and part of the joint end 63 is easily accommodated in the groove 25. As a result, the molded motor 100 that is more easily assembled is obtained.

(6) Since the protrusions 26 are formed near the groove 25, the tip end part 631 is protected even if the tip end part 631 of the joint end 63 accommodated in the groove 25 is formed to raise from the end face of the outer shell. In other words, even if, for example, the finger or the like of an operator comes close to the tip end part 631, the protrusions 26 prevent the finger from touching the tip end part 631. Therefore, the tip end part 631 is hardly disengaged from the groove 25. As a result, the molded motor 100 that is more easily assembled is obtained. In addition, since the protrusions 26 are formed on both sides of the groove 25, the tip end part 631 of the joint end 63 accommodated in the groove 25 is protected by the protrusions 26 on the both sides. Therefore, the tip end part 631 is further hardly disengaged from the groove 25.

(7) Since the protrusions 26 are formed at the edges of the groove 25 distant from the side face 21 of the outer shell, part of the joint end 63 may be, if necessary, disengaged from the groove 25 by the application of a force to the vicinity of a boundary between the side face 21 of the outer shell and the groove 25. As a result, the molded motor 100 that is easily reassembled is obtained.

Second Modification

Figure 10:
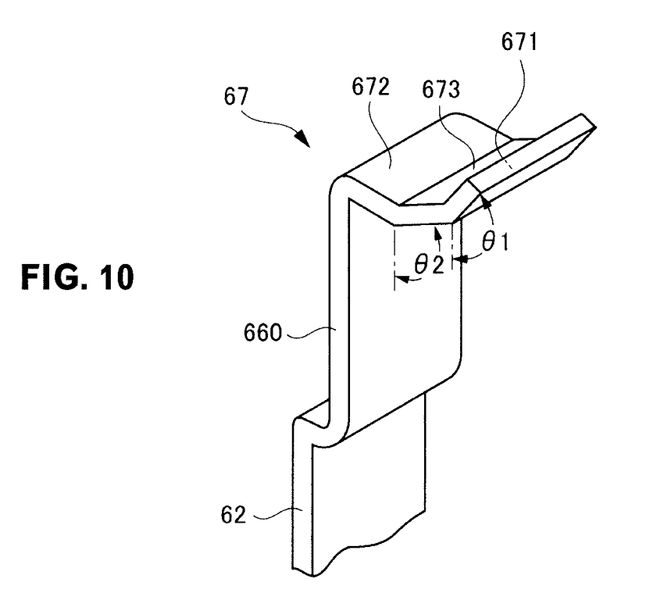
FIG. 10 is an enlarged perspective view of a joint end according to a second modification.

FIG. 10 is an enlarged perspective view of a joint end 67 according to a second modification. Except that the shape of the tip end part of the joint end 67 is different from that of the embodiment, the second modification is the same as the embodiment in other constituents or the like.

In FIG. 10, the joint end 67 has the joint part 670, an engagement part 672, a tip end part 671, and an intermediate part 673 having an intermediate angle θ2 of greater than 90° and less than 180° relative to the conductive strip 62, the intermediate part 673 being provided between the engagement part 672 and the tip end part 671.

Figure 11A:
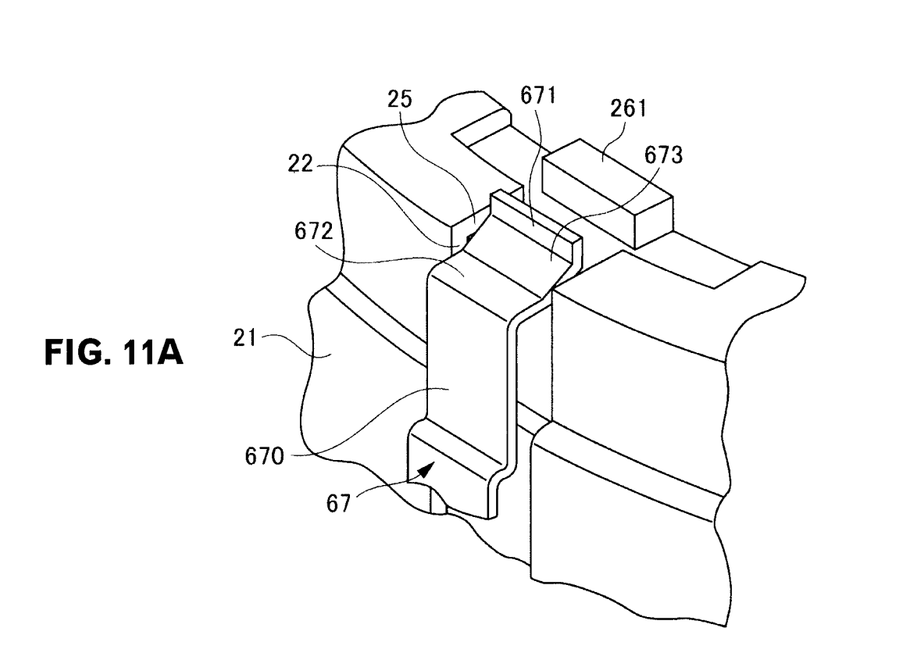
FIG. 11A is a view illustrating a state before the joint end according to the second modification is accommodated in a groove.
Figure 11B:
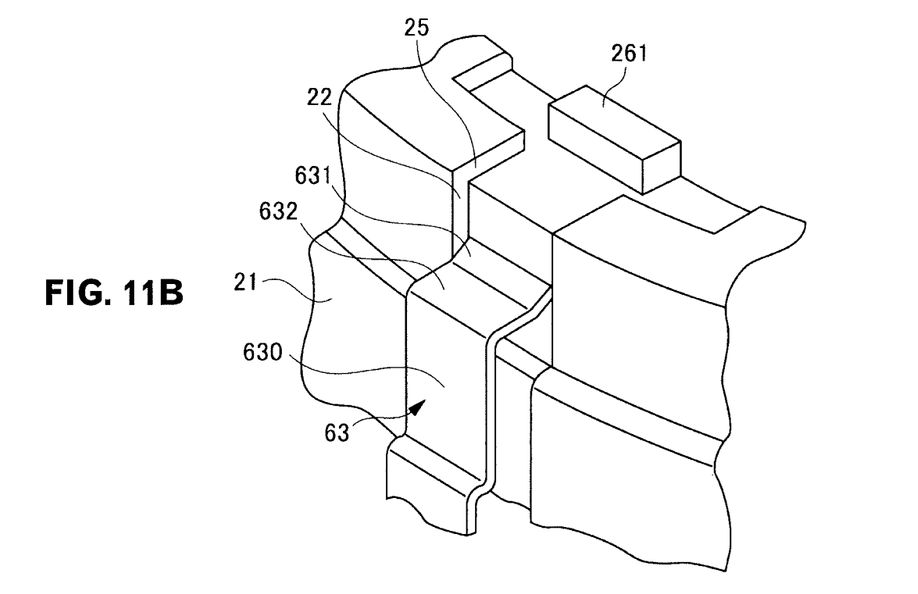
FIG. 11B is a view illustrating a state before the joint end according to the embodiment is accommodated in the groove.

FIG. 11A is a view illustrating a state before part of the joint end 67 according to the second modification is accommodated in the groove 25, and FIG. 11B is a view illustrating a state before part of the joint end 63 according to the embodiment is accommodated in the groove 25.

According to the second modification, one protrusion 261 is formed on the molded resin 20 on the inner periphery side of the groove 25 as illustrated in FIG. 11A. In addition, the intermediate part 673 is provided that has the intermediate angle θ2 of greater than 90° and less than 180° relative to the conductive strip 62. Therefore, compared with the tip end part 631 according to the embodiment illustrated in FIG. 11B, the joint end 67 reaches a boundary between the groove part 22 (side face 21) and the groove 25 quickly. As a result, the attachment of the conductive plate 60 is facilitated. In addition, if the intermediate angle θ2 is adjusted to set the tip end angle θ1 at almost 180°, the tip end part 671 may come in surface-contact with the side face 21 of the groove part 22. As a result, the risk of damaging the side face 21 of the outer shell of the molded resin 20 is further reduced.

According to the second modification described above, the following advantages are obtained.

(7) Since the intermediate part 672 having the intermediate angle θ2 of greater than 90° and less than 180° is provided between the tip end part 671 and the joint part 670, the joint end 67 reaches the boundary between the side face 21 of the outer shell and the groove 25 more quickly and thus passes through the boundary more quickly when moving from the side face 21 of the outer shell of the molded resin 20 to the groove 25 on the end face 24 of the outer shell formed in the direction orthogonal to the side face 21 of the outer shell. Accordingly, the side face 21 of the outer shell of the molded resin 20 is hardly damaged by the joint end 67, and the joint end 67 is more easily accommodated in the groove 25. As a result, the molded motor 100 that is more easily assembled is obtained.

Note that the molded motor 100 according to the embodiment may be used as, for example, a motor that drives an air blasting fan in a domestic room air-conditioner. When the molded motor 100 is for use in an indoor unit, a cross flow fan is attached to the output rotary shaft 31. When the molded motor 100 is for use in an outdoor unit, a propeller fan is attached to the output rotary shaft 31.

The preferred embodiment of the present invention is described in detail above. However, the present invention is not limited to the embodiment described above, and variations and modifications may be made without departing from the scope of the present invention described in the appended claims.

For example, the conductive plate 60 may have the joint ends 63 at its both ends, and the joint ends 63 may be each joined to the bracket 51 on the output side and the bracket 52 on the counter output side in a state of being held by the molded resin 20.

In addition, the ring-shaped end 61 may be press-fitted in the bearing house 510 on the output side. Moreover, even if the bearing 41 on the output side and the bearing 42 on the counter output side are different in size and shape, the advantages described above are obtained so long as the bearing 41 and the bearing 42 have conductivity. Furthermore, the groove part 22 (other than the groove part 22 formed in the step 23) of the side face 21 of the molded resin 20 on its outermost side may not be formed.

The invention claimed is:

1. A molded motor comprising:
a stator having an outer shell molded by a molded resin;
a rotor rotatably arranged on an inner diameter side of the stator;
conductive bearings configured to support an output side and a counter output side of an output rotary shaft of the rotor;
conductive brackets in which bearing houses configured to accommodate the bearings are arranged on an output side and a counter output side of the outer shell; and
a conductive plate having a ring-shaped end with convex portions formed at an inner peripheral face thereof and configured to be press-fitted in an outer periphery of at least one of the bearing house on the output side and the bearing house on the counter output side, the conductive plate being configured to establish electrical continuity between the bracket on the output side and the bracket on the counter output side.

2. The molded motor according to claim 1, wherein
a groove part configured to accommodate the conductive plate is provided in an end face of the outer shell on the counter output side and in a side face of the outer shell.

3. The molded motor according to claim 1, wherein
the convex portions are bended in a direction opposite to a direction in which the ring-shaped end is inserted into one of the bearing houses.

4. The molded motor according to claim 1, wherein
the convex portions are formed at three or more places along the inner peripheral face of the ring-shaped end.

5. The molded motor according to claim 1, wherein
the conductive plate has a plate-shaped conductive strip extending from part of a ring outer periphery of the ring-shaped end, and
at least one of the convex portions is arranged in a direction opposite to a direction in which the conductive strip is drawn.

6. The molded motor according to claim 1, wherein
a tip end face of each of the convex portions is processed into a shape matching a side face of each of the bearing houses and is chamfered at a corner thereof.

7. The molded motor according to claim 1, wherein
the convex portions have dimensions such that a length L1 of a base of each of the convex portions in a ring peripheral direction is larger than a length L2 of each of the convex portions in a diameter direction.

8. The molded motor according to claim 1, wherein
the bearing houses are formed into bottomed cylindrical shapes each having a bottom face and a side face, and
a corner part connecting the bottom face to the side face is formed into an R-shape having a predetermined curvature.

9. A molded motor comprising:
a stator having an outer shell molded by a molded resin;
a rotor rotatably arranged on an inner diameter side of the stator;
conductive bearings configured to support an output side and a counter output side of an output rotary shaft of the rotor;
conductive brackets in which bearing houses configured to accommodate the bearings are arranged on an output side and a counter output side of the outer shell; and
a conductive plate having conductivity configured to establish electrical continuity between the brackets, wherein the conductive plate has a plate-shaped conductive strip and joint ends provided at both ends of the conductive strip, the conductive strip is arranged along the outer shell, and at least one of the joint ends has
- a joint part configured to be joined to one of the brackets in a state of being held between the corresponding bracket and a side face of the outer shell,
- an engagement part positioned ahead of the joint part and configured to engage an end face of the outer shell, and
- a tip end part positioned ahead of the engagement part and provided to raise from the end face of the outer shell.

10. The molded motor according to claim 9, wherein a groove part configured to accommodate the conductive plate is provided in the outer shell.

11. The molded motor according to claim 9, wherein the brackets have the bearing houses configured to accommodate the bearings, and the other of the joint ends has a ring-shaped end configured to be press-fitted in one of the bearing house on the output side and the bearing house on the counter output side.

12. The molded motor according to claim 9, wherein a length of the conductive strip from the ring-shaped end to the side face of the outer shell is larger than a length from the joint part to the tip end part.

13. The molded motor according to claim 9, wherein a protrusion configured to protect the tip end part of the conductive plate is formed on the end face of the outer shell.

* * * * *